Aug. 3, 1926.

T. A. VOSS 1,595,040

MILK BOTTLE

Filed Jan. 20, 1925

WITNESSES

INVENTOR
T. A. Voss
BY
ATTORNEYS

Patented Aug. 3, 1926.

1,595,040

UNITED STATES PATENT OFFICE.

THEODORE AUGUST VOSS, OF PHOENICIA, NEW YORK.

MILK BOTTLE.

Application filed January 20, 1925. Serial No. 3,645.

My invention relates to a milk bottle and particularly to a sanitary bottle which may be thoroughly cleaned with facility.

The general object of my invention is to provide a bottle free from all angles at the interior and presenting smooth surfaces, the bottle as well being open at both ends for the ready and thorough cleaning of the bottle.

A further object of the invention is to provide a bottle that may be stood on either end or placed on its side and held against rolling.

The nature of my invention and its distinguishing features and advantages will more clearly appear as the description proceeds.

Reference is to be had to the accompanying drawings forming a part of this specification, it being understood that the drawings are merely illustrative of one example of the invention.

Figure 1:
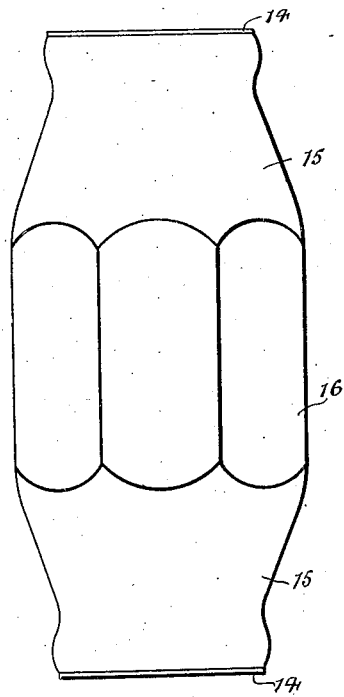
Figure 1 is a side elevation of a bottle embodying my invention, the same being shown standing on an end thereof.
Figure 2:
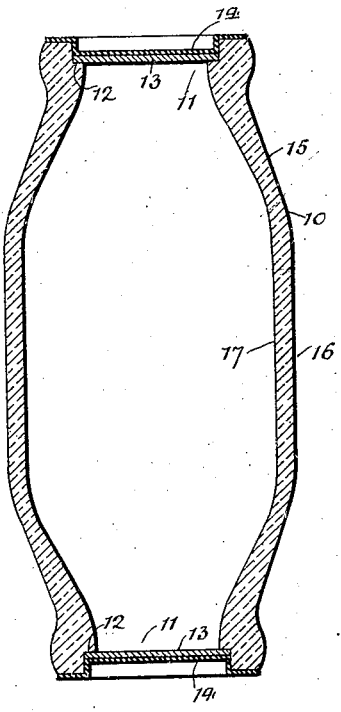
Figure 2 is a vertical section in standing position.
Figure 3:
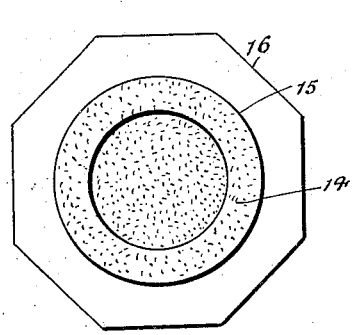
Figure 3 is an end view of the bottle.
Figure 4:
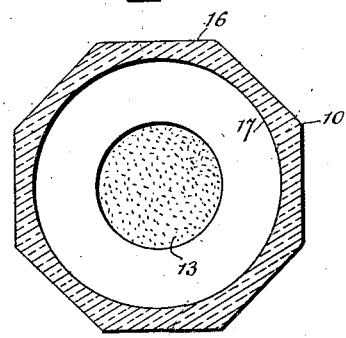
Figure 4 is a cross section at the center of the bottle.
Figure 5:
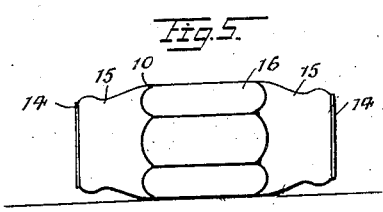
Figure 5 is an elevation of the bottle showing the same on its side.

In practice the bottle designated generally by the numeral 10 is formed with open ends 11, the ends of the bottle being alike. Each end is shown with the usual shoulder 12 to receive the paper closure disk or cap 13. The numeral 14 indicates paraffin over the paper disks and over each end of the bottle.

The ends of the bottle taper and provide necks 15, 15, and at the central zone 16 the bottle has polygonal form, the bottle in the instance shown being octagonal. The interior surface 17 of the bottle is round in cross section at the central zone and at the tapered ends so that the bottle is free from angles in which the milk might collect and dry, making it difficult to clean the bottle. With my improved bottle when the same is empty and the caps removed, a thorough cleansing can be obtained by reason of the capability of cleansing water passing through the bottle.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:—

As a new article of manufacture, a milk bottle of similar shape at both ends, said bottle being open at both ends, internally cylindrical at its intermediate portion, and internally conically tapering toward said open ends, shoulders at the ends of the bottle adapted to receive paper caps, the bottle at its intermediate portion being of greatest diameter and externally polygonal in shape to prevent rolling thereof when the bottle is laid upon its side.

THEODORE AUGUST VOSS.